(12) United States Patent
Couallier et al.

(10) Patent No.: US 6,186,694 B1
(45) Date of Patent: Feb. 13, 2001

(54) DEVICE FOR PERMANENTLY COUPLING TWO SHAFTS

(75) Inventors: Antoine Couallier, Herbault; André Laisement, La Chapelle Encherie; Benoît De Rincquesen, Vendome, all of (FR)

(73) Assignee: Lemförder Nacam SA, Vendome (FR)

( * ) Notice: Under 35 U.S.C. 154(b), the term of this patent shall be extended for 0 days.

(21) Appl. No.: 08/985,510

(22) Filed: Dec. 5, 1997

(30) Foreign Application Priority Data

Dec. 13, 1996 (FR) .................................................. 96 15482

(51) Int. Cl.[7] ....................................................... F16B 7/00
(52) U.S. Cl. ............................ 403/225; 403/223; 403/383
(58) Field of Search ................................. 403/270, 273, 403/271, 272, 265, 225, 223, 221, 52, 57, 383; 74/492; 464/89

(56) References Cited

U.S. PATENT DOCUMENTS

| | | | |
|---|---|---|---|
| 2,199,926 | * | 5/1940 | Swennes ................................. 464/75 |
| 4,479,786 | * | 10/1984 | De Bisscho ............................. 464/89 |
| 5,086,661 | * | 2/1992 | Hancock ................................. 74/493 |
| 5,259,818 | * | 11/1993 | Kachi et al. ............................ 464/89 |
| 5,366,413 | * | 11/1994 | Yamaguchi et al. .................... 464/89 |
| 5,464,251 | * | 11/1995 | Castellon ............................... 74/492 |
| 5,509,324 | * | 4/1996 | Cymbal .................................. 74/492 |
| 5,836,821 | * | 11/1998 | Yamada et al. ........................ 74/492 |

\* cited by examiner

*Primary Examiner*—Anthony Knight
*Assistant Examiner*—Vishal Patel
(74) *Attorney, Agent, or Firm*—Laubscher & Laubscher (57) ABSTRACT

A device for permanently coupling two shafts rotatable about a common axis comprises a tubular intermediate member disposed between the outer shaft and the inner shaft, an elastic connecting member disposed between the inner shaft and the tubular intermediate member, the elastic member being attached directly to the inner shaft and to the tubular intermediate member; and rotational connecting means between the outer shaft and the tubular intermediate member. When the coupling is mounted on an automobile vehicle steering column, the inner shaft is a tube of the steering shaft and the outer shaft is the connection end of the yoke of a universal joint.

20 Claims, 4 Drawing Sheets

DEVICE FOR PERMANENTLY COUPLING TWO SHAFTS

BACKGROUND OF THE INVENTION

1. Field of the Invention

The present invention concerns a device for permanently coupling two shafts rotatable about a common axis.

The permanent coupling device of the invention is more particularly intended to be mounted on an automobile vehicle steering column.

2. Description of the Prior Art

Devices for permanently coupling two automobile vehicle steering column shafts using locking snap fastener mechanical systems are known in themselves. Other permanent coupling devices associate two shafts permanently by means of a rubber intermediate member so that the coupling absorbs vibrations and slight misalignments of the axes. The latter devices must additionally include a rotational drive safety system to guard against degradation or deterioration of the rubber. The safety system most often used consists in a mechanical key between the two shafts. These various devices are relatively complex and cause difficulties with the manufacture of the shaft receiving the rubber intermediate member.

OBJECT OF THE INVENTION

With the aim of avoiding the disadvantages described hereinabove, the main object of this invention is to propose a permanent coupling device that is flexible and that has an architecture that is simple to manufacture.

SUMMARY OF THE INVENTION

According to the invention, the device for permanently coupling an outer shaft and an inner shaft rotatable about a common axis characterized in that it includes:
- a one-piece assembly disposed and mounted in an inside face the outer shaft and comprising:
  - a tubular intermediate assembly disposed between the outer shaft and the inner shaft; and
  - an elastic connecting member disposed between the inner shaft and the intermediate tubular assembly, the elastic connecting member being attached directly to the inner shaft and to the tubular intermediate assembly to constitute the one-piece assembly;
- rotational prevention connecting means between the outer shaft and the one-piece assembly; and
- axial displacement prevention connecting means between the outer shaft and the one-piece assembly.

In embodiment's variants of the invention, the tubular intermediate assembly comprises a tubular intermediate member.

In other variants of embodiment, the tubular intermediate assembly includes a tubular intermediate member and a tubular additional member that are fastened together. The elastic connecting member is fastened directly to the tubular additional member and to the inner shaft to constitute a one-piece subassembly. The rotational connecting means are disposed between the outer shaft and the tubular intermediate member. This type of embodiment facilitates fitting in a mass production context in some cases.

Advantageously, the rotation prevention connecting means between the outer shaft and the one-piece assembly comprise an interference fit of the tubular intermediate member in the outer shaft. The interference fit is carried out by means of a male area or bearing surface of the tubular intermediate member and a female area or inside surface of the outer shaft which are provided with teeth of conjugate shapes that cooperate with each other.

To guarantee coupling in the axial direction, the axial displacement prevention connecting means between the outer shaft and the one-piece assembly comprise:
- a shoulder in the tubular intermediate member between a male bearing surface of the tubular intermediate member and a body portion of the tubular intermediate member, a bearing face of the outer shaft being pressed against the shoulder; and
- a deformation at a free end of the male area or bearing surface that cooperates with and is pressed by crimping against a divergent shape on the inside face of the outer shaft.

In a variant of embodiment, the axial displacement prevention connecting means comprise:
- a bead located on the tubular intermediate member between the male area or bearing surface and the body portion, a bearing face of the outer shaft being pressed onto the bead; and
- a deformation at the free end of the male area or bearing surface that cooperates with and is pressed by crimping against a divergent shape on the inside face of the outer shaft.

In another variant of embodiment, the rotation preventing connecting means and the axial displacement prevention connecting means between the outer shaft and the one-piece assembly comprise a bead weld between the outer shaft and the tubular intermediate member.

For safety reasons it is necessary to have safety means for the rotation preventing connection between the inner shaft and the tubular intermediate member in order to guarantee transmission of torque in the event of degradation of the elastic member. These safety means consist in:
- a shape on the outside face of the inner shaft; and
- a shape made on the inside face of the tubular intermediate member and disposed on the side opposite the elastic member in a housing of the tubular intermediate member;
- the two shapes having conjugate profiles with a predetermined clearance between these two shapes so that the two shapes come into contact and transmit torque in the event of degradation of the elastic member.

In another variant of embodiment according to the invention, the safety means for the rotation preventing connection between the inner shaft and the tubular intermediate member comprise:
- a shape on the outside face of the inner shaft; and
- a shape on the inside face of the tubular intermediate member and extending along the entire length of the tubular intermediate member so that the elastic member is disposed between the two shapes;
- the two shapes having conjugate profiles with a predetermined clearance between these two shapes so that the two shapes come into contact and transmit torque in the event of degradation of the elastic member.

The shapes on the inner shaft and on the tubular intermediate member are advantageously characterized in that:
- the shape on the outside face of the inner shaft has two diametrally opposite circular portions which are joined together by two parallel flat portions substantially perpendicular to the axis of symmetry of the two circular portions; and the shape on the inside face of the tubular intermediate member has two circular portions and two flat portions which are substantially complementar to the circular portions and the flat portions of the outside face of the inner shaft and with slightly greater dimensions respectively so as to obtain the predetermined clearance between the shapes.

For improved safety, the invention provides safety means for the axial connection in the required direction between the inner shaft and the tubular intermediate member, in order to prevent the extraction of this coupling in the event of degradation of the elastic member.

The safety means for the axial connection comprise a deformation at an end of the inner shaft that cooperates with and is pressed against a divergent shape on the inside face of the tubular intermediate member.

The tubular intermediate member can be made in various ways without departing from the scope of the invention. In a first embodiment, the body of the tubular intermediate member is a circular section tube.

In another embodiment, the body of the tubular intermediate member is a tube the section of which has two diametrally opposite circular portions which are joined together by two parallel flat portions substantially perpendicular to the axis of symmetry of the two circular portions so that the elastic member has the desired thickness.

In another embodiment, the body of the intermediate tubular member, connected to the inner shaft through the elastic member, is a tube the section of which has two diametrally opposite circular portions which are joined together by two concave portions so that the elastic member has the desired thickness.

It is particularly interesting to apply the permanent coupling device according to the invention to an automobile vehicle steering column. In this case, the inner shaft is a tube of the steering shaft and the outer shaft is the connection end of the yoke of a universal joint.

According to the invention, the assembling of a permanent coupling device of an outer shaft and an inner shaft rotatable about a common axis, assembled according to the steps of:

disposing an elastic member between the inner shaft and a tubular intermediate member;

fastening by adhesion the elastic connecting member to the inner shaft and to the tubular intermediate member whereby the tubular intermediate member and the elastic member constitute a one-piece assembly;

mounting the one-piece assembly in the outer shaft and fastening the one-piece assembly to the outer shaft to assure a rotational connection and an axial connection between the outer shaft and the one-piece assembly;

forming a first deformation at an end of the inner shaft oriented to the outer shaft and pressing the first deformation against a divergent shape on an inside face of the tubular intermediate member to assure an axial connection in a required direction between the inner shaft and the tubular intermediate member, in order to prevent the extraction of this coupling in the event of degradation of the elastic member.

In another embodiment, the assembly method comprises the following steps:

disposing the elastic member between the inner shaft and a tubular additional member;

fastening by adhesion the elastic member to the inner shaft and to a tubular additional member so as to constitute a one-piece subassembly;

mounting the one-piece subassembly in a tubular intermediate member to constitute a one-piece assembly;

then mounting the one-piece assembly as in the previous method; and forming a deformation to assure the axial connection as in the previous method.

In the two precedent methods, the mounting of the one-piece assembly and the fastening to the outer shaft include the following steps:

the one-piece assembly is mounted in the outer shaft by engaging teeth of the male area or bearing surface of the tubular intermediate member in teeth of the female area or inside face of the outer shaft until the outer shaft abuts against the shoulder on the tubular intermediate member to assure the rotational connection between the outer shaft and the one-piece assembly; and a deformation is formed by crimping at the free end of the male area or bearing surface so as to be pressed against a divergent shape on the inside face of the outer shaft to assure the axial connection between the outer shaft and the one-piece assembly.

In one variant of the method of assembling the one-piece assembly described hereinabove, the one-piece assembly is mounted in the outer shaft so that it abuts against a bead on the tubular intermediate member.

In another variant of the method of assembling the one-piece assembly described hereinabove, the one-piece assembly is mounted in the outer shaft and a bead weld is formed between the outer shaft and the tubular intermediate member to assure the rotational and axial connection between the outer shaft and the one-piece assembly.

The permanent coupling device of the invention therefore has the advantage of a structure that is very simple to manufacture, with guaranteed quality of manufacture when mass produced, as in the automobile industry. This is of particular benefit for obtaining the tubular intermediate member and for assembling the outer shaft and the tubular intermediate member integrated into the one-piece assembly.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

The permanent coupling device of the invention is intended to connect two shafts 1 and 2 rotatable about a common axis X—X and which include elastic connecting means. The embodiment shown in the figures concerns a permanent coupling device more particularly intended for an automobile vehicle steering column, the outer shaft 1 being the tubular connecting end of the yoke of a universal joint and the inner shaft 2 being a tube that is part of the steering shaft.

As can be seen in FIGS. 1, 2, 3, 4, 9 and 10 the device in accordance with the invention for permanently coupling the two shafts 1 and 2 includes:

a tubular intermediate assembly comprising a tubular intermediate member 4 disposed between the outer shaft 1 and the inner shaft 2;

elastic connecting means comprising an elastic member 3 disposed between the inner shaft 2 and the tubular intermediate member 4; and rotation prevention connecting means between the outer shaft 1 and the tubular intermediate member 4.

The elastic member 3 is attached directly to the inner shaft 2 and to the tubular intermediate member 4.

Figures 1, 1A, 2, 2A:
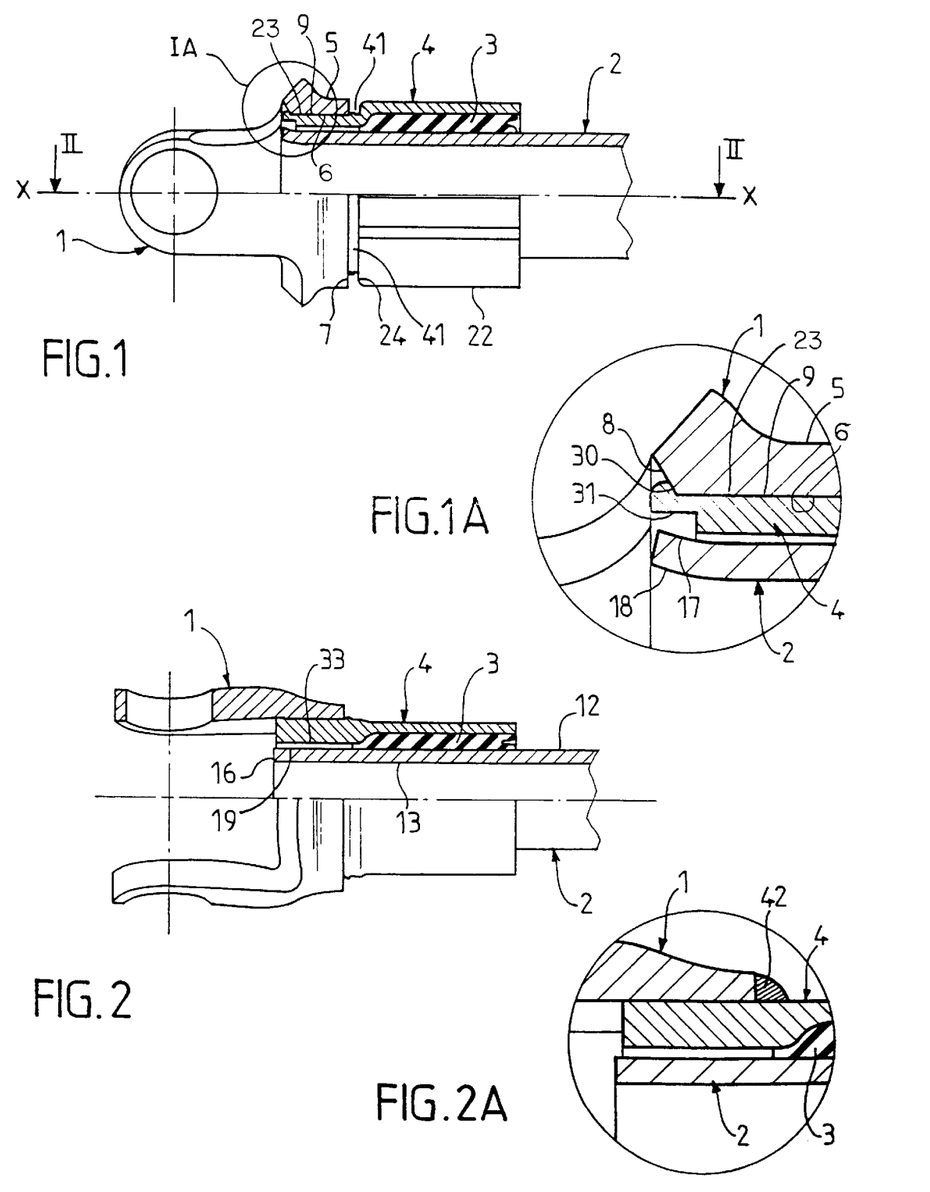
FIG. 1 is a half-section axial view of the coupling device of the invention as a whole.
FIG. 1A is a part of FIG. 1 to a larger scale.
FIG. 2 is a view in section taken along the line II—II in FIG. 1.
FIG. 2A is a part of FIG. 2 to a larger scale in the case of a variant embodiment.
Figure 3:
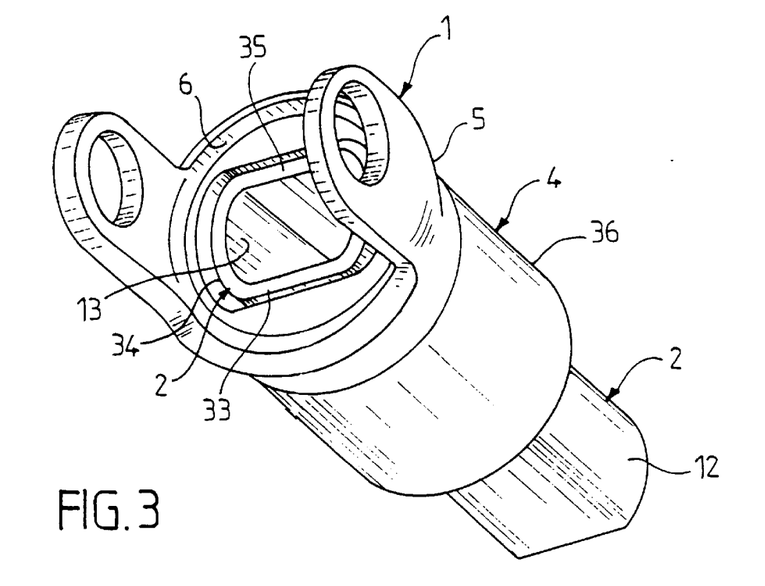
FIG. 3 is a perspective view of the FIG. 1 embodiment seen from the outer shaft end.
Figure 4:
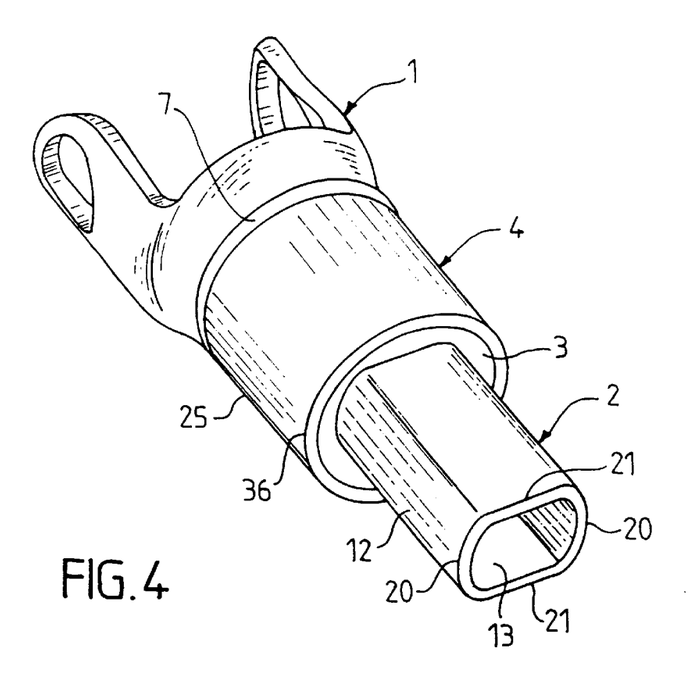
FIG. 4 is a perspective view of the FIG. 1 embodiment seen from the inner shaft end.

The outer shaft 1 is tubular with an outside face 5 and a circular inside face 6. This inside face 6, called as a female area, is provided with teeth 9. The end of the inside face 6 on the same side as the yoke of the universal joint has a divergent shape 8. The outer shaft 1 has at the end opposite the inside face 6 a bearing face 7 that is substantially perpendicular to said inside face 6.

Figure 5:
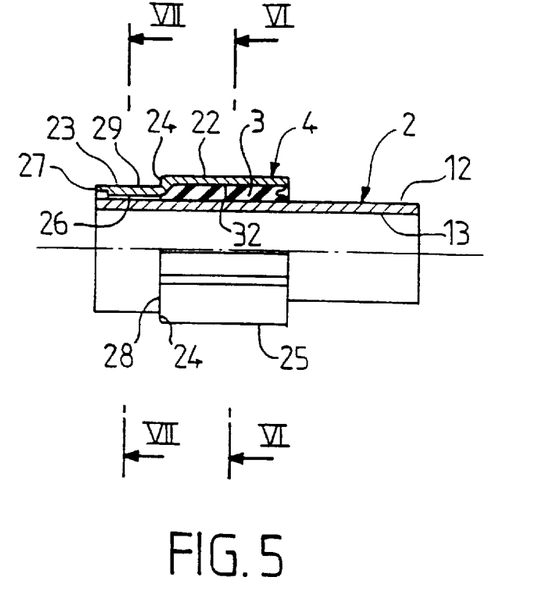
FIG. 5 is a half-section axial view of part of the device shown in FIG. 1 before assembly to the outer shaft.

As shown in FIG. 5 in particular, the tubular intermediate member 4 comprises a body 22 with a circular constriction at one end that constitutes a bearing surface, called as a male area 23. This bearing surface or male area 23 is provided with teeth 29 which have a profile conjugate with that of the teeth 9 on the inside face 6 or female area of the outer shaft 1. The body 22 includes a housing 32 which is adapted to receive the elastic member 3. The tubular intermediate member 4 therefore has a shoulder 24 at the end 28 of the bearing surface 23, the other end of which bears the reference number 27.

The outside face 25 of the body 22 of the tubular intermediate member 4 and the inside face 26 of the circular constriction have profiles that will be described hereinafter in connection with the various embodiments of the invention.

The inner shaft 2 has an outside face 12 and an inside face 13 that will be described hereinafter.

The rotation prevention connecting means between the outer shaft 1 and the tubular intermediate member 4 consist in an interference fit between the circular constriction with its male area or bearing surface 23 of the tubular intermediate member 4 in the inside face or female area 6 of the outer shaft 1, the dimensions and the respective teeth 29 and 9 of conjugate shape of which cooperate with each other.

The permanent coupling device of the invention includes axial displacement prevention connecting means between the outer shaft 1 and the tubular intermediate member 4 that are shown in FIGS. 1, 1A and 5 in particular. The axial displacement prevention connecting means between the outer shaft 1 and the tubular intermediate member 4 comprise:

the shoulder 24 made in the tubular intermediate member 4 between the end 28 of the male area or bearing surface 23 and the body 22 onto which the bearing face 7 of the outer shaft 1 is pressed; and a deformation 30 at the free end 27 of the male area or bearing surface 23 that cooperates with and is pressed by crimping against a divergent shape 8 on the inside face 6 of the outer shaft 1.

In a variant of the invention, the bearing face 7 of the outer shaft 1 is pressed against a bead 41 (FIG. 1) adjoining the shoulder 24 on the body 22. These embodiments guarantee permanent coupling in the axial direction in accordance with the invention.

In the variant shown in FIG. 2A, the rotation prevention connecting means and the axial displacement prevention connecting means between the outer shaft 1 and the tubular intermediate member 4 comprise a weld 42. The weld 42 is formed between the bearing face 7 of the outer shaft 1 and the tubular intermediate member 4.

In accordance with the invention the permanent coupling device includes rotational safety means for the rotation prevention connection between the inner shaft 2 and the tubular intermediate member 4 shown in FIGS. 2, 3, 4, 5 and 7. The safety means guarantee transmission of torque in the event of degradation of the elastic member. The safety means for the rotation prevention connection between the inner shaft 2 and the tubular intermediate member 4 comprise:

a shape 19 (FIG. 7) on the outside face 12 of the inner shaft 2; and a shape 33 on the inside face 26 of the tubular intermediate member 4 on a side opposite the elastic member 3 in a housing 32 of the tubular intermediate member 4.

Figure 7:
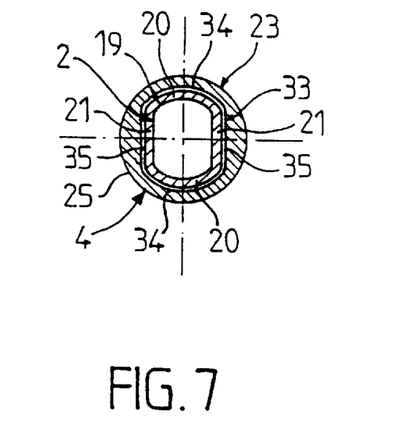
FIG. 7 is a view in section taken along the line VII—VII in FIG. 5.

The shapes 19 and 33 have conjugate profiles with some clearance between the two shapes so that the two shapes 19 and 33 come into contact and transmit torque in the event of degradation of the elastic member 3.

The shape 19 on the face 12 of the inner shaft 2 has two diametrally opposed circular portions 20 joined together by two parallel flat portions 21 substantially perpendicular to the axis of symmetry of the two circular portions 20. The shape 33 on the inside face 26 of the tubular intermediate member 4 has two circular portions 34 and two flat portions 35 disposed in exactly the same way as the exterior shape of the inner shaft 2, with slightly greater dimensions to obtain the necessary clearance between the two shapes 19 and 33.

The permanent coupling device of the invention further includes safety means for the axial displacement prevention connection in the required direction between the inner shaft 2 and the tubular intermediate member 4 in order to prevent extraction of this coupling in the event of degradation of the elastic member 3. These safety means are shown more particularly in FIGS. 1A and 2. The safety means for the axial connection in the required direction between the inner shaft 2 and the tubular intermediate member 4 comprise a deformation 17 which is located at the end 16 of the intermediate shaft 2 and which cooperates with and is pressed against a divergent shape 31 on the inside face 26 of the tubular intermediate member 4.

The tubular intermediate member 4 may be made in various ways to suit the various embodiments and uses of the permanent coupling device of the invention. In the embodiments shown in FIGS. 3, 4 and 7 the body of the tubular intermediate member 4 which is connected to the inner shaft 2 by the elastic member 3 is a circular section tube 36.

Figure 8:
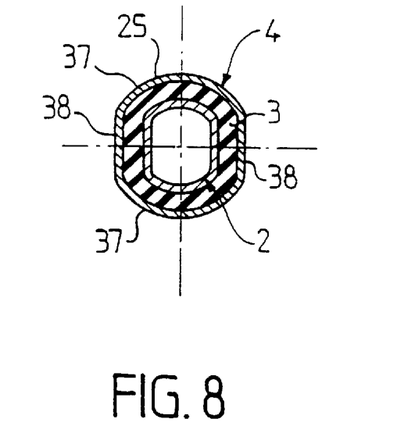
FIG. 8 shows a variant embodiment on the same section plane as FIG. 6.

In the embodiment of the invention shown in FIG. 8 the body 22 of the tubular intermediate member 4 that is connected to the inner shaft 2 by the elastic member 3 is a tube the section of which has two diametrally opposite circular portions 37. These two circular portions 37 are joined together by two parallel flat portions 38 substantially perpendicular to the axis of symmetry of the two circular portions 37. The body 22 is made in such a way that the elastic member 3 has the desired thickness.

Figure 6:
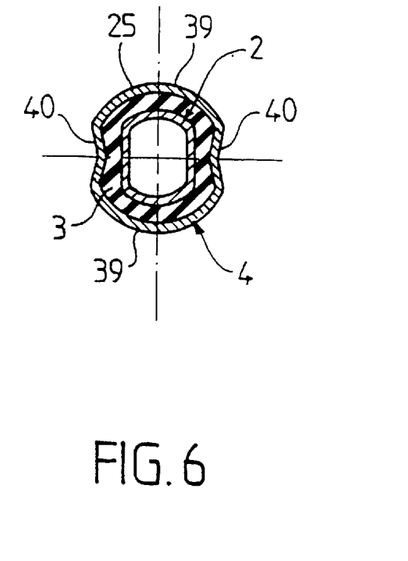
FIG. 6 is a view in section taken along the line VI—VI in FIG. 5.

In the embodiment of the invention shown in FIG. 6 the body 22 of the tubular intermediate member 4 that is connected to the inner shaft 2 by the elastic member 3 is a tube the section of which has two diametrally opposite circular portions 39 that are joined together by two concave portions 40 so that the elastic member 3 has the desired thickness.

The difference between the shapes in the FIGS. 6 and 8 embodiments is to provide different coupling stiffness characteristics.

Figure 9:
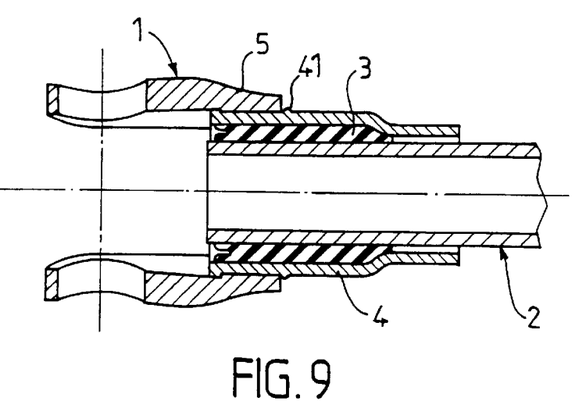
FIG. 9 is a sectional axial view of another embodiment of the invention.

The permanent coupling device of the invention shown in FIG. 9 is similar to that shown in FIG. 1. In FIG. 9, the outer shaft 1 is disposed around the tubular intermediate member 4 at the same end as the elastic member 3. The rotation prevention connecting means and the axial displacement prevention connecting means between the outer shaft 1 and the tubular intermediate member 4 can be those described previously, i.e. teeth 29 and 9 of conjugate shape, a bead 41 and a deformation 30 that is pressed against a divergent shape 8, or a bead weld 42.

Figure 10:
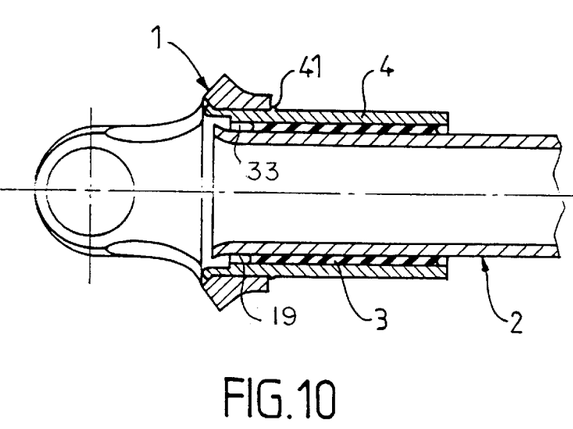
FIG. 10 is a sectional axial view of another embodiment of the invention.

The permanent coupling device shown in FIG. 10 includes an elastic member 3 disposed along the entire length of the tubular intermediate member 4.

In this configuration, the safety means for the rotation prevention connection between the inner shaft 2 and the tubular intermediate member 4 are similar to those described previously and comprise:

- a shape 19 on the outside face 12 of the inner shaft 2, and
- a shape 33 which is made on the inside face 26 of the tubular intermediate member 4 and all along said tubular intermediate member 4, so that the elastic member 3 is disposed between the shape 33 and the shape 19.

The shapes 19 and 33 have conjugate profiles with some clearance so that the elastic member 3 can be disposed between two shapes and so as to transmit torque in the event of degradation of the elastic member 3.

Figure 11:
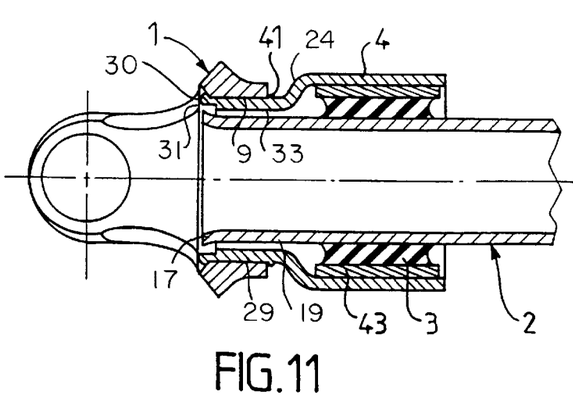
FIG. 11 is a sectional axial view of another embodiment of the invention.

The permanent coupling device shown in FIG. 11 comprises a tubular intermediate assembly that includes a tubular intermediate member 4 and a tubular additional member 43. The tubular additional member 43 can be of metal, synthetic plastic material or another material.

The tubular intermediate member 4 and the tubular additional member 43 are fastened together. In this type of embodiment the elastic member 3 is attached directly to the tubular additional member 43 and to the inner shaft 2 to constitute a one-piece subassembly. This one-piece subassembly is then attached to the tubular intermediate member 4 to constitute a one-piece assembly. This type of architecture is particularly beneficial for mass production.

The method of assembling the permanent coupling device of the invention including two shafts 1 and 2 rotatable about a common axis X—X and elastic connecting means 3 is characterized in that:

the elastic connecting means comprise an elastic member 3 which is disposed between the inner shaft 2 and a tubular intermediate member 4;

the elastic member 3 is fastened by adhesion to the inner shaft 2 and to the tubular intermediate member 4 so as to constitute a one-piece assembly;

the one-piece assembly is mounted in the outer shaft 1 and fastened to said outer shaft to assure the rotational connection and the axial connection between the outer shaft 1 and the one-piece assembly;

a deformation 17 is formed at the end 16 of the inner shaft 2 at the same end as the outer shaft 1 so as to be pressed against the divergent shape 31 on the inside face 26 of the tubular intermediate member 4 to assure the axial connection in the required direction between the inner shaft 2 and the tubular intermediate member 4.

In another embodiment, the assembly method is characterized in that:

the elastic connecting means comprise an elastic member 3 which is disposed between the inner shaft 2 and a tubular additional member 43 (FIG. 11);

the elastic member 3 is fastened by adhesion to the inner shaft 2 and to the tubular additional member 43 so as to constitute a one-piece subassembly;

the one-piece subassembly is mounted in a tubular intermediate member 4 so as to constitute a one-piece assembly;

the one-piece assembly is mounted in the outer shaft 1 and fastened to said outer shaft to assure the rotation preventing connection and the axial connection between the outer shaft 1 and the one-piece assembly;

a deformation 17 is formed at the end 16 of the inner shaft 2 at the same end as the outer shaft 1 so as to be pressed against the divergent shape 31 on the inside face 26 of the tubular intermediate member 4 to assure the axial connection in the required direction between the inner shaft 2 and the tubular intermediate member 4.

In both the above assembly methods, the assembling of the one-piece assembly and the attachment to the outer shaft 1 include the following steps:

the one-piece assembly is mounted in the outer shaft 1 by engaging the teeth 29 of the male area or bearing surface 23 of the tubular intermediate member 4 in the teeth 9 of the female area or inside face 6 of the outer shaft 1 to abut against the shoulder 24 on the tubular intermediate member 4 to assure the rotation prevention connection between the outer shaft 1 and the one-piece assembly;

a deformation 30 is formed at the other end 27 by crimping so as to be pressed against a divergent shape 8 on the inside face 6 of the outer shaft 1 to assure the axial displacement prevention connection between the outer shaft 1 and the one-piece assembly.

In a variant of the method of assembling the one-piece assembly described hereinabove, the one-piece assembly is mounted in the outer shaft 1 to abut against a bead 41 on the tubular intermediate member 4.

In another variant of the method of assembling the one-piece assembly described hereinabove the one-piece assembly is mounted in the outer shaft and a bead weld 42 is formed between the outer shaft 1 and the tubular intermediate member 4 to assure the rotation prevention connection and the axial displacement prevention connection between the outer shaft 1 and the one-piece assembly.

What we claim is:

1. A shaft coupling for permanently coupling a pair of shafts, comprising:

(a) an inner shaft (2);

(b) a tubular outer shaft (1) arranged in coaxially spaced relation about said inner shaft;

(c) a tubular intermediate assembly (4) arranged coaxially between said inner and outer shafts;

(d) an annular elastic connecting member (3) arranged coaxially between said inner shaft and said tubular intermediate assembly, respectively, said elastic connecting member being permanently secured to said inner shaft and to said tubular intermediate assembly;

(e) first axial displacement prevention means (30, 41; 30, 24; 42) adjacent a first end of said intermediate assembly for preventing axial displacement of said intermediate assembly relative to said outer shaft;

(f) first safety means (17, 31) adjacent said first end of said intermediate assembly for preventing axial displacement of said inner shaft in at least one direction relative to said intermediate assembly in the event of degradation of said elastic member;

(g) first rotation prevention means (23, 6; 42) preventing rotation of said intermediate assembly relative to said outer shaft; and (h) second safety means (19, 33) preventing relative rotation between said inner shaft and said tubular intermediate assembly in the event of degradation of said elastic member.

2. A shaft coupling as defined in claim 1, wherein said tubular intermediate assembly comprises a tubular intermediate member.

3. A shaft coupling as defined in claim 1, wherein said tubular intermediate assembly includes a tubular intermediate member (4) and a concentrically arranged tubular additional member (43) that are fastened together, said elastic member being permanently secured directly between said tubular additional member and said inner shaft to constitute a one-piece subassembly, and said rotation prevention means being provided on said outer shaft and on said tubular intermediate member.

4. A shaft coupling as defined in claim 1, wherein said elastic connecting member is adhesively secured to said inner shaft.

5. A shaft coupling as defined in claim 1, wherein said inner shaft is a tube of said steering shaft of an automobile vehicle steering column, and of said outer shaft is a connection end of a yoke of a universal joint.

6. A shaft coupling as defined in claim 3, wherein said rotation prevention means between said outer shaft and said one-piece assembly comprises an interference fit between said tubular intermediate member and said outer shaft, a male bearing surface of said tubular intermediate member being in cooperation with a female inside surface of said outer shaft, said male bearing surface and said female inside surface being provided with teeth of conjugate shapes that cooperate with each other.

7. A shaft coupling as defined in claim 3, wherein said axial displacement prevention means between said outer shaft and said one-piece assembly comprises:

(a) a shoulder arranged on said tubular intermediate member between a male bearing surface of said tubular intermediate member and a body portion of said tubular intermediate member, a bearing face of said outer shaft being pressed against said shoulder; and (b) a deformation which is located at a free end of said bearing surface and cooperates with and is pressed by crimping against a divergent shape on said inside face of said outer shaft.

8. A shaft coupling as defined in claim 3, wherein said axial displacement prevention means between said outer shaft and said one-piece assembly comprises:

(a) a bead on said tubular intermediate member onto which a bearing face of said outer shaft is pressed; and (b) a deformation which is located at a free end of a male bearing surface and cooperates with and is pressed by crimping against a divergent shape on said inside face of said outer shaft.

9. A shaft coupling as defined in claim 3, wherein said rotational prevention means and said axial displacement prevention means comprises a bead weld between said outer shaft and said tubular intermediate member.

10. A shaft coupling as defined in claim 2, wherein said first safety means for preventing rotation between said inner shaft and said tubular intermediate member comprises:

(a) a shape on an outside face of said inner shaft; and (b) a shape made on an inside face of said tubular intermediate member and disposed on a side opposite said elastic connecting member in a housing of said tubular intermediate member;

(c) said shapes having conjugate profiles with a predetermined clearance between said shapes so that said shapes come into contact and transmit torque in the event of degradation of said elastic connecting member.

11. A shaft coupling as defined in claim 2, wherein said first safety means for preventing rotation between said inner shaft and said tubular intermediate member comprises:

(a) a shape on an outside face of said inner shaft; and (b) a shape which is made on an inside face of said tubular intermediate member and extends all along said tubular intermediate member so that said elastic connecting member is disposed between said shapes;

(c) said shapes having conjugate profiles with a predetermined clearance between said shapes so that said shapes come into contact and transmit torque in the event of degradation of said elastic connecting member.

12. A shaft coupling as defined in claim 2, wherein said second safety means for preventing axial displacement in said direction between said inner shaft and said tubular intermediate member includes a deformation at an end of said inner shaft, said deformation cooperating with and being pressed against a divergent shape on an inside face of said tubular intermediate member.

13. A shaft coupling as defined in claim 10 wherein:

(a) said shape on said outside face of said inner shaft has two diametrally opposite circular portions which are joined together by two parallel flat portions substantially perpendicular to an axis of symmetry of said two circular portions; and (b) said shape on said inside face of said tubular intermediate member has two circular portions and two flat portions which are substantially complementary to said circular portions and said flat portions of said outside face of said inner shaft and with slightly greater dimensions respectively so as to obtain said predetermined clearance between said shapes.

14. A shaft coupling as defined in claim 13, wherein said tubular intermediate member has a body portion which is a circular section tube.

15. A shaft coupling as defined in claim 13, wherein said tubular intermediate member has a body portion which is a tube having a section with two diametrally opposite circular portions which are joined together by two parallel flat portions substantially perpendicular to an axis of symmetry of said two circular portions of said body portion so that said elastic connecting member has a desired thickness.

16. A shaft coupling as defined in claim 13, wherein said intermediate tubular member has a body portion which is a tube said section of which has two diametrally opposite circular portions which are joined together by two concave portions so that said elastic connecting member has a desired thickness.

17. A shaft coupling as defined in claim 3, wherein said first safety means for preventing rotation between said inner shaft and said tubular intermediate member comprises:
   (a) a shape on an outside face of said inner shaft; and
   (b) a shape made on an inside face of said tubular intermediate member and disposed on a side opposite said elastic connecting member in a housing of said tubular intermediate member;
   (c) said shapes having conjugate profiles with a predetermined clearance between said shapes so that said shapes come into contact and transmit torque in the event of degradation of said elastic connecting member.

18. A shaft coupling as defined in claim 3, wherein said first safety means for preventing rotation between said inner shaft and said tubular intermediate shaft comprises:
   (a) a shape on an outside face of said inner shaft; and
   (b) a shape which is made on an inside face of said tubular intermediate member and extends all along said tubular intermediate member so that said elastic connecting member is disposed between said shapes;
   (c) said shapes having conjugate profiles with a predetermined clearance between said shapes so that said shapes come into contact and transmit torque in the event of degradation of said elastic connecting member.

19. A shaft coupling as defined in claim 3, wherein said second safety means for preventing axial displacement in said direction between said inner shaft and said tubular intermediate member includes a deformation at an end of said inner shaft, said deformation cooperating with and being pressed against a divergent shape on an inside face of said tubular intermediate member.

20. A shaft coupling as defined in claim 3, wherein said elastic connecting member is adhesively secured to said inner shaft and to said tubular additional member.

* * * * *